(12) United States Patent
Blanchard et al.

(10) Patent No.: US 6,516,325 B1
(45) Date of Patent: Feb. 4, 2003

(54) VIRTUAL PARTITION VECTOR FOR A COMPUTER DIRECTORY SYSTEM

(75) Inventors: Perin Blanchard, Orem, UT (US); Daniel Wallace Rapp, Alpine, UT (US)

(73) Assignee: Novell, Inc., Provo, UT (US)

( * ) Notice: Subject to any disclaimer, the term of this patent is extended or adjusted under 35 U.S.C. 154(b) by 314 days.

(21) Appl. No.: 09/588,962

(22) Filed: Jun. 7, 2000

Related U.S. Application Data

(60) Provisional application No. 60/165,697, filed on Nov. 16, 1999.

(51) Int. Cl.$^7$ .................................................. G06F 17/30
(52) U.S. Cl. ................................ 707/104.1; 707/103 R
(58) Field of Search .......................... 707/104.1, 103 R, 707/201, 500.1

(56) References Cited

U.S. PATENT DOCUMENTS

| | | | | |
|---|---|---|---|---|
| 5,434,994 A | * | 7/1995 | Shaheen et al. | 707/203 |
| 5,701,484 A | * | 12/1997 | Artsy | 358/402 |
| 5,781,910 A | * | 7/1998 | Gostanian et al. | 707/10 |
| 5,909,540 A | * | 6/1999 | Carter et al. | 714/4 |
| 6,052,724 A | * | 4/2000 | Willie et al. | 707/10 |

* cited by examiner

*Primary Examiner*—Diane D. Mizrahi
(74) *Attorney, Agent, or Firm*—Haynes & Boone, LLP

(57) ABSTRACT

An improved system, method and database program is provided for automatically creating a replica of data distributed throughout a database onto a replica server. The method identifies an action to be performed on the data and/or a subset of objects of the data for receiving the action. A scope of the distributed database is determined, including a root of the database for accessing all of the data. With this information, a vector is created and provided to the root. As a result, the root can recursively inherit the vector down the distributed database to one or more branches until all of the data is accessed, so that the action can be performed on all the data.

18 Claims, 2 Drawing Sheets

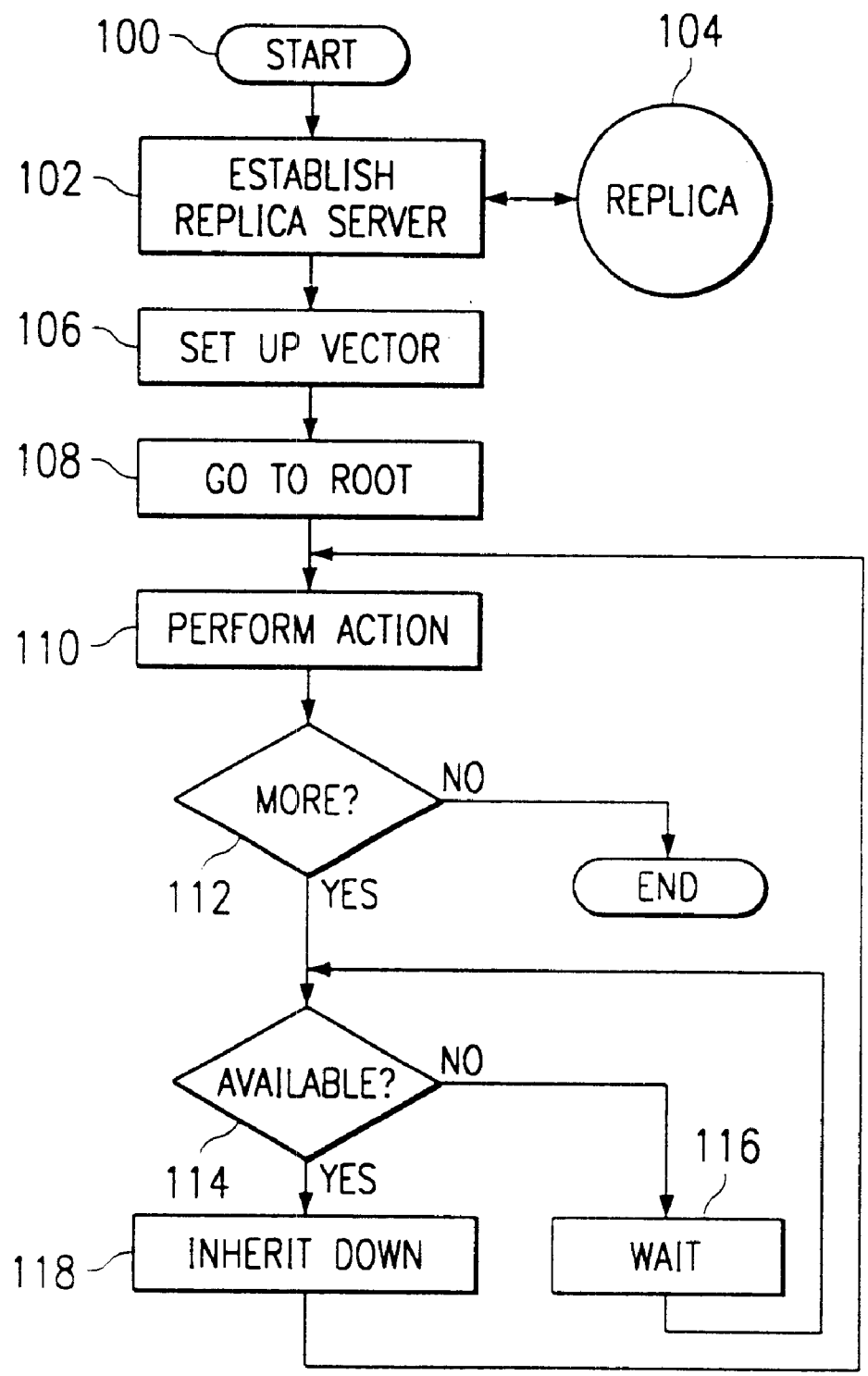

VIRTUAL PARTITION VECTOR FOR A COMPUTER DIRECTORY SYSTEM

CROSS-REFERENCE

This application claims the benefit of U.S. Provisional Application Serial No. 60/165,697, filed Nov. 16, 1999.

BACKGROUND SECTION

This invention relates generally to computer software, and more specifically to a system and method for implementing a directory system in a distributed computer environment.

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the clients of the server.

Directories and directory services are often provided to enable an environment for an entry of a particular resource. One example of a directory service is Novell Directory Services ("NDS") for Novell Netware networks, as provided by Novell, Inc. of Provo, Utah. NDS is an X.500 directory system for hierarchical directories, and implements a logical tree-structure view of all resources on the network so that clients can access them without knowing where they are physically located.

For database applications where computers are widely distributed (e.g., geographically), replication provides an efficient way for distributed systems to access current information. Replication enables many computers or computer applications to work with their own local, current copy, or replica, of one or more entries. Since a widely distributed network may rely on many network links for connecting several servers and clients, a replica can provide an efficient method for storing specific copies of the entries.

However, replicas can often be very difficult to establish, the level of difficulty being directly proportional with the expanse of the network distribution. This can be particularly time consuming for an administrator or other entity(s) who determine the structure of the tree and maintain the database. For example, a company may have a distributed network that utilizes servers in many different countries on different continents. A distributed database on such a network may have entries on literally thousands of different servers. In the present example, the administrator may desire to create a replica of specific entries in the database in a specific replica server. To create the replica from this exemplary distributed directory, many different servers must be accessed and many network connections must be utilized. Administratively, this may be an extremely time consuming process. Furthermore, one or more network connections or servers may be down at any point in time, thereby extending the time and effort required.

It is desired to provide a simple mechanism for retrieving entries in a distributed network.

It is also desired to reduce administrative complexity, including accommodating any network servers or connections that may be down.

SUMMARY

In response to these and other problems, an improved system, method and database program are provided for automatically creating a replica of data distributed throughout a database. In one embodiment, the method identifies an action to be performed on the data, and may also identify a subset of objects, such as attributes of the data, for receiving the action. A scope of the distributed database is determined, including a root of the database for accessing all of the data. With this information, a vector is created and provided to the root. As a result, the root can recursively inherit the vector down the distributed database to one or more branches until all of the data is accessed, so that the action can be performed on all the data.

In another embodiment, the database program receives a vector into a root of the database, the vector identifying an action to be performed. The database program then performs the action on data in the root, if any of the data so exists, and determines if a branch of the root is to be accessed. If a branch is to be accessed, the database program inherits the vector down to the branch and designates the branch as a new root. The database program can then repeat the previous instructions on the new root until no more new roots are designated.

There are various reasons why a branch may not be accessed. For one, a network connection to a server for the branch may be down. Also, the server itself may be down. Further, there may be no more branches to access. For whatever reason a branch may not be accessed, the database program handles this reason appropriately and automatically, without requiring extensive intervention from a network administrator.

An advantage of the present invention is that the virtual partition vector does not need to view the entire tree.

Another advantage of the present invention is that the administrator or other entity does not have to visit every partition of the tree to create the replica on the replica server.

Yet another advantage is that once the administrator sends the virtual partition vector to the root, existing directory services can take over operation.

These and other advantages can be readily seen by further examination of the attached figures and the following description.

BRIEF DESCRIPTION OF THE FIGURES

FIG. 3 is a flowchart of a method for implementing one embodiment of the present invention, such as can be implemented by a software program running on one or more computers shown in FIG. 1.

DESCRIPTION OF EMBODIMENTS

The present invention provides a unique system and method that facilitates the creation of replicas in a distributed network environment. It is understood that the following disclosure provides many different embodiments, or examples, for implementing different features. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

Figure 1:
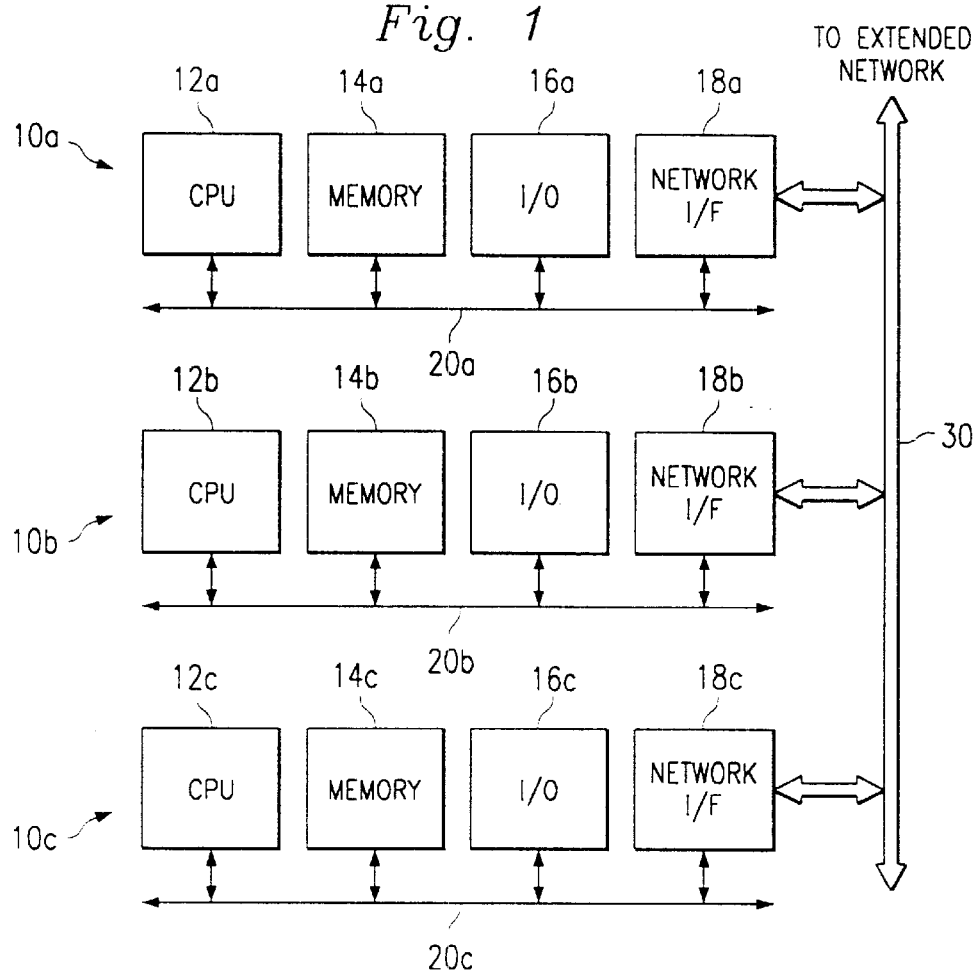
FIG. 1 illustrates a simplified computer system including two computers and a network, the system being used for implementing one embodiment of the present invention.

Referring now to FIG. 1, three similar computer systems, designated 10a and 10b, are illustrated as a representative example of an operating environment for the present invention. Each computer 10a, 10b, 10c includes a central processing unit ("cpu") 12a, 12b, 12c, a memory unit 14a, 14b, 14c, an input/output ("I/O") device 16a, 16b, 16c, and a network interface 18a, 18b, 18c, respectively. The components 12a, 14a, 16a, and 18a are interconnected by a bus system 20a, the components 12b, 14b, 16b, and 18b are interconnected by a bus system 20b, and the components 12c, 14c, 16c, and 18c are interconnected by a bus system 20c. It is understood that each of the listed components may actually represent several different components. For example, the cpu 12a may actually represent a multi-processor or a distributed processing system; the memory unit 14b may include different levels of cache memory, main memory, hard disks, and remote storage locations; and the I/O device 16c may include monitors, keyboards, and the like.

The computers 10a, 10b, 10c are also commonly connected to a network 30. The network 30 may be representative of several networks, such as a local area network, a company wide intranet, and/or the internet. Because the computers 10a, 10b, 10c are connected to the network 30, certain components may, at times, be shared between the computers. Therefore, a wide range of flexibility is anticipated in the configurations of the computers. Furthermore, it is understood that, in many implementations, the computers 10a, 10b, 10c may be configured differently from each other, may have different components, and/or one computer may act as a server to the other computer.

The present invention facilitates many different operational scenarios of the computers 10a, 10b, 10c and the network 30. Single server environments and multi-server environments, as well as distributed and non-distributed environments, may benefit from the present invention. A distributed, multi-server environment will be discussed below to provide just one example of how the present invention operates.

Figure 2:
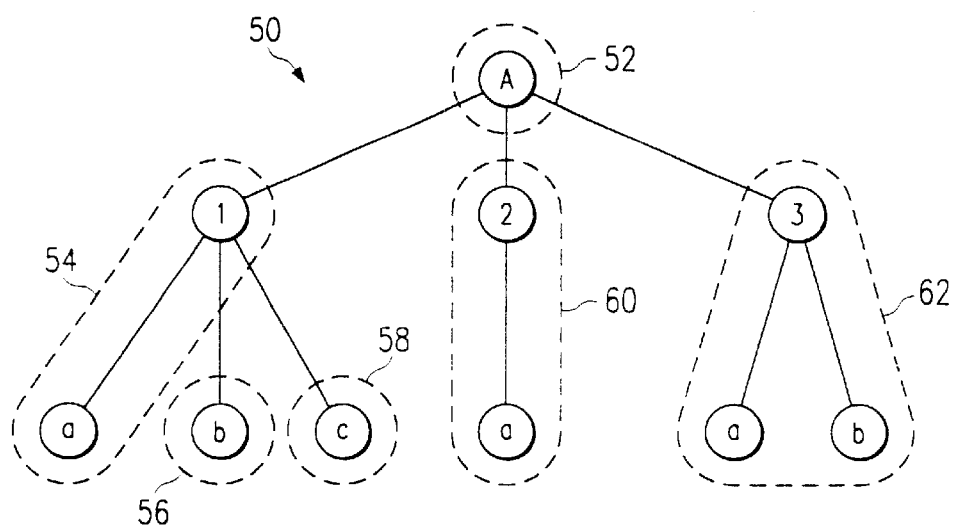
FIG. 2 is a diagram of an exemplary distributed directory system used in the computer system of FIG. 1.

Referring now to FIG. 2, the computers 10a, 10b, 10c and the network 30 are used to provide a hierarchical distributed directory system 50. For the sake of example, the directory 50 is a NDS having a logical "tree-structure" view of all resources on the network. The tree has a "root" with several "branches," and each branch can serve as a root for additional branches. As a result, the computers 10a, 10b, 10c can access the resources without knowing where the resources are physically located (be it computer 10a, computer 10b, computer 10c, the network 30, or some other entity). For the sake of example, the directory 50 uses an online directory service protocol called LDAP, or Lightweight Directory Access Protocol. The directory includes one or more entries, each of which is a collection of attributes with a unique identifier.

In the present example, the directory 50 is broken into exclusive, non-overlapping "containers." A top level container A is connected to different lower containers 1, 2, 3, which are then connected to even lower containers a, b, c, etc. In furtherance of the present example, the top level container A may represent the overall directory structure for a large company; the containers 1, 2, 3 represent various cities that the company is located; and the lowest containers a, b, c represent different entities of the company, e.g., container a is for sales, container b is for marketing, and container c is for engineering. By combining the container names for more definite reference, sales 1a, 2a, 3a is in every city, marketing 1b, 3b is in two cities, and engineering 1c is only in one city. The container A is a root for the entire directory 50 and has branches of containers 1, 2, 3; the container 1 is a root for containers (branches) 1a, 1b, 1c; and so forth.

One or more contiguous containers can be grouped into a single partition. A partition is a logical construct that is not limited to a single physical location. In the present example, container A is in a partition 52; containers 1 and 1a are in a partition 54; container 1b is in a partition 56; containers 1c is in a partition 58; containers 2 and 2a are in a partition 60; and containers 3, 3a, and 3b are in a partition 62.

The computers 10a, 10b, 10c can store one or more containers and/or partitions, or a partition can be distributed over several computers. Furthermore, a computer, such as the computer 10a, can not only be configured as a server for storing one or more partitions, but may also be configured for storing one or more replicas. Although replicas may be stored in one or more servers, the computer will be referred to as a single replica server for the sake of clarity.

A problem arises when a user of the network needs to get information from everywhere in the tree, i.e., a central "view" of the tree, and not just the local partition. The traditional solution is to "walk the tree" by going from partition to partition, bouncing from server to server. Walking the tree can be a very long and tedious process, bogging down various components in the distributed network. Distributed network systems are often undesirable because it is difficult to get a central view of the network tree.

One solution is to allow the user to define information in a filter, referred to as a "filter set," including such things as one or more user "objects" and a partition "cope." For example, a partition may have entries for each person in the company A, each entry including various attributes pertaining to the person such as first name, last name, telephone number, mail stop, and so forth. The user may select user objects consisting only of, for example, a first name, last name, and telephone number of each person in the company A. The user may also define a partition scope by identifying specific partitions to view, in this example, the user is looking for persons at the city 1, so the user identifies partitions 54, 56 and 58. Once the user has defined a filter set, a "filtered view" may be stored on the replica server by setting up virtual replicas, or filtered replicas. Therefore, the filtered replica has a copy of every selected partition, but not everything in the partitions. In this way, the replica server does not have to replicate and store large amounts of data that the user does not want. This aggregates a centralized view across an entire distributed network.

Therefore, a network administrator must only walk the tree once to create the replica. However, going from partition to partition is still a very long and tedious process for the administrator. Furthermore, one or more servers and/or partitions may not be accessible at any particular time. For example, a network connection may be down, or a server that contains one or more partitions may be down. The more distributed the database, the more likely this is to occur.

To alleviate the difficulties of walking the tree, the present embodiment utilizes a virtual partition vector. Table 1, below, provides several items that may be in the virtual partition vector. The virtual partition vector provides a simple mechanism to allow the administrator to specify which partitions to place in the replica server, be it for a replica, filtered replica, or other type of copy. The administrator provides the virtual partition vector to the network tree and the directory service (e.g., the NDS system) will cause the virtual partition vector to be inherited down the tree hierarchy. As it is inherited, a partition may be added to the virtual server, a partition may be deleted, and so forth.

TABLE 1

| Item | Description |
| --- | --- |
| VECTOR | Identifies and formats a specific virtual partition vector |
| SERVER | The replica server(s) for storing the replica |
| SCOPE | Identifies specific partitions required for the replica |
| OBJECTS | Identifies desired entries and attributes in each partition |
| ACTION | The action to be performed on the identified objects |

Referring now to FIG. 3, a method 100 describes one embodiment for implementing and utilizing a virtual partition vector. The method 100 can be performed on a distributed network system, such as the network 50 of FIG. 2, for a specific filter set. Execution begins at step 102, where a replica 104 is initialized on a replica server. At step 106, a virtual partition vector is established for the specified filter set.

In continuance with the previous example, the user has defined a partition scope by identifying persons at the city 1 (partitions 54, 56 and 58) and selected user objects consisting only of a first name, last name, and telephone number of each person in the partition scope. The user also has defined a specific server to be the replica server (e.g., the computer 10*a* of FIG. 1). Therefore, the filter set defines the SCOPE and OBJECTS items, the replica server defines the SERVER item, and additional instructions (e.g., adding a partition) define the ACTION item to create the VECTOR item of Table 1.

At step 108, the virtual partition vector is provided to a specific root that serves the partition scope identified in the vector. This may require the assistance of the administrator or other entity who has knowledge of the network and rights to the network. In the present example, the city 1 container is the root that serves all of the necessary partitions 54, 56, and 58 and is stored in a specific server (e.g., the computer 10*b* ). The network administrator may use a conventional administrative tool to determine and access the specific root (city 1).

At step 110, the virtual partition vector is applied to and stored in the root. The application of the virtual partition vector to the root may depend on, among other things, the filter set and actions listed in the virtual partition vector. In the present example, the virtual partition vector is stored in the city 1 container (from the SCOPE item), and any entries or attributes that pertain to a first name, last name, or telephone number of a person (from the OBJECTS item) in city 1 are communicated (the ACTION item) to the replica server 10*a*.

At step 112, a determination is made as to whether or not more servers must be accessed. If not, execution stops. If so, execution proceeds to step 114 where a determination is made as to whether or not the next server is available. The next server is identified as the next server "down" the tree. That is, one of the servers that is considered a branch of the previously identified root. A server is available if it and its network link are up and running.

If at step 114 the next server is not available, then execution proceeds to step 116 where a predetermined period of time elapses. Execution then returns to step 114 to continually check the next server's availability. In an X.500 distributed directory, background processes can periodically check the virtual partition vector and the next server. Once the next server becomes available, execution proceeds to step 118 where the virtual partition vector is "inherited down" to the next server. That is, the virtual partition vector is propagated down the tree hierarchy. The next server now becomes the root, and execution returns to step 110. Steps 114–118 may be concurrently performed for several servers that are all branches of the present root.

Continuing with the above example, the city one container is in the server 10*b* and the containers 1*a*, 1*b*, and 1*c* are in the server 10*c*. If the city 1 container is the present root, then execution returns to step 114 where steps 114–118 may be performed for each of the containers 1*a*, 1*b*, and 1*c*. If the containers 1*a*, 1*b*, and 1*c* are in different servers, then steps 114–118 may be concurrently performed at each server.

An advantage of the present invention is that the virtual partition vector does not need to view the entire tree.

Another advantage of the present invention is that the user or administrator does not have to visit every partition of the tree to create the replica on the replica server.

Yet another advantage is that once the administrator sends the virtual partition vector to the root, existing directory services can take over operation to automate the process.

It is further understood that other modifications, changes and substitutions are intended in the foregoing disclosure and in some instances some features of the disclosure will be employed without corresponding use of other features. For example, the virtual partition vector can be used in situations other than "virtual" or sparse/fractional replicas. Accordingly, it is appropriate that the appended claims be construed broadly and in a manner consistent with the scope of the disclosure.

We claim:

1. A method for facilitating a copy of a subset of data stored in a distributed database, the method comprising the steps of:

identifying an action to be performed on the subset of data;

identifying a scope of the distributed database so that the subset of data is included within the scope;

creating a vector with the action and scope;

determining a root of the distributed database responsive to the scope; and providing the vector to the root;

whereby the root can recursively inherit the vector down the distributed database to one or more branches until all of the data is accessed, so that the action can be performed on all of the subset of data, and whereby the copy is updated by the action being performed on the subset of data.

2. The method of claim 1 further comprising the step of: identifying a subset of objects of the data for receiving the action.

3. The method of claim 1 wherein the database is partitioned, the scope is a partition scope, and the data are entries in one or more partitions.

4. The method of claim 1 wherein the root defines less than the entire database.

5. In a distributed computing system, a database program for establishing a replica of a predetermined scope of a database, the predetermined scope being less than the entire database, the database program comprising instructions for:

receiving a vector into a root of the database, the vector identifying an action to be performed;

performing the action on data in the root, if data for the replica so exists;

determining if a branch of the root is to be accessed; and responsive to the determining, inheriting the vector down to the branch of the root and designating the branch as a root;

repeating the instructions for performing, determining, and inheriting until the action has been performed on all of the data for the replica, thereby automatically establishing the replica.

6. The database program of claim 5 wherein the instructions for determining if a branch of the root is to be accessed includes instructions for determining if a network connection to a server on which the branch is stored is up.

7. The database program of claim 6 further comprising instructions for:

waiting until the network connection is up and then repeating the instructions for determining if a branch of the root is to be accessed.

8. The database program of claim 5 wherein the instructions for determining if a branch of the root is to be accessed includes instructions for determining if a server on which the branch is stored is up.

9. The database program of claim 8 further comprising instructions for:

waiting until the network connection is up and then repeating the instructions for determining if a branch of the root is to be accessed.

10. The database program of claim 5 wherein the database is partitioned, the predetermined scope is a partition scope not including all the partitions of the database, and the data are entries in one or more partitions of the partition scope.

11. The database program of claim 10 wherein the vector identifies a subset of objects of the data entries and wherein the action is only performed on the identified objects.

12. The database program of claim 5 wherein the root identifies a subset of the database.

13. A computing system comprising:

first and second computers, each having a processing unit and a memory for storing data;

a database having data distributed between the first and second computer memories;

a third computer having a memory for storing a replica, the replica being a copy of some, but not all, of the data in the database;

a network for connecting the first, second, and third computers;

means for receiving a vector into the first computer, the vector identifying an action to be performed on the data;

means for identifying a specific portion of data in the memory of the first computer that corresponds to the replica;

means for performing the action on the specific portion of data in the first computer and communicating the action to the third computer;

means for determining if the second computer is accessible from the first computer; and means for inheriting the vector down to the second computer responsive to a positive determination that the second computer is accessible.

14. The computing system of claim 13 wherein the means for determining if the second computer is accessible includes means for determining if a connection of the network to the second computer is up.

15. The computing system of claim 14 further comprising:

means for waiting until the network connection is up.

16. The computing system of claim 13 wherein the database is partitioned and the data are entries in one or more partitions.

17. The computing system of claim 16 wherein the vector identifies a subset of objects of the data entries and wherein the action is only performed on the identified objects.

18. The computing system of claim 13 wherein the root identifies a subset of the database.

* * * * *